United States Patent

[11] 3,582,237

[72] Inventor Max Edward Grantham
Plympton, Plymouth, Devon, England
[21] Appl. No. 768,640
[22] Filed Oct. 18, 1968
[45] Patented June 1, 1971
[73] Assignee Tecalemit Engineering Limited
Plymouth, Devon, England

[54] FLUID DISPLACEMENT UNITS
13 Claims, 2 Drawing Figs.
[52] U.S. Cl. .................................................. 417/377
[51] Int. Cl. .................................................. F04b 17/00
[50] Field of Search .................................... 103/44
(W), 52; 230/52, 54; 417/392, 377, 393; 184/29

[56] References Cited
UNITED STATES PATENTS
2,555,613 6/1951 Soberg .................... 103/44
2,877,712 3/1959 McGay .................... 103/44X
3,333,425 8/1967 Hemard .................... 230/52X Primary Examiner—Robert M. Walker
Attorney—Mason, Mason & Albright ABSTRACT: A displacement unit for delivering quantities of fluid, particularly lubricant, in response to changes in the pressure of fluid supplied to it, comprises a housing chamber having an inlet and an outlet, first and second pistons movable in said chamber, and resilient means biasing the first piston, and with it the second piston, towards said inlet, the first piston having a passage through it which is closed during a delivery stroke by the second piston and a restricted passage being provided past said second piston, such that the supply of fluid under pressure to the inlet moves both pistons together towards the outlet to discharge fluid from the chamber, fluid then entering a space behind the first piston through said restricted passage, whereas a drop in the inlet pressure causes fluid pressure in the said space to move the second piston away from the first to allow the discharge through said passage of fluid from said space.

PATENTED JUN 1 1971

3,582,237

INVENTOR
MAX EDWARD GRANTHAM
by Mason, Mason & Albright

3,582,237

FLUID DISPLACEMENT UNITS

SUMMARY OF THE INVENTION

This invention relates to units which are operated by pressure changes or signals in a fluid which is supplied to the unit, in order to give an output which consists of a number of deliveries of predetermined quantities of the fluid.

It is an object of the invention to provide novel and improved units for this purpose which are economical in construction and efficient in their operation.

The invention provides a fluid displacement unit for delivering predetermined quantities of a fluid supplied to it under pressure in response to periodic increases and decreases in the said pressure, said unit comprising:

a housing chamber having an inlet and an outlet for said fluid, a first piston which is reciprocable in said chamber and has a fluid passage extending through it, a second piston which is movable in said chamber between said inlet and said first piston which it engages to close said passage, said pistons together dividing a reserve space in part of said chamber from said inlet and said outlet except for a constricted passage for allowing fluid under pressure to flow from said inlet and said space past said second piston, and resilient means biasing said first piston against said second piston to close said passage whereby a supply of fluid to said inlet under pressure acts on and moves both said pistons together away from said inlet and against the force of said resilient means to discharge fluid from said chamber to said outlet while fluid from said inlet enters said reserve space through said constricted passage, whereas a drop in pressure in said inlet allows said resilient means to return said first piston to its original position, the pressure of the fluid in said reserve space first moving said second piston away from said first piston to allow this fluid from said space to be discharged through said passage.

In a preferred embodiment of the invention the second piston member is a ball which acts as a valve to close either or both the fluid inlet and the passage through the first piston member, while constricted passage may be formed by a clearance between the ball and the wall of the housing chamber.

The biasing member is preferably an annulus of resilient material which may also seal the communication between the said space and the outlet port, when the passage through the first piston member is closed by the ball.

Alternatively, the biasing means may be a helical spring and the said space may be is sealed from the outlet by the first piston member making fluidtight sliding contact with the housing.

The clearance between the second piston member or ball and the wall of the chamber will be selected to prevent cavitation behind the first piston member on the pumping or delivery stroke while keeping down leakage past this member during the initial stages of the return stroke.

The unit which has been described combines a small size and simplicity of operation with the ability to react, without leakage, to a pressure signal irrespective of the frequency, duration or rate of change of the signal. The unit may be and is particularly intended to be used in lubrication systems so that the unit delivers lubrication liquid through its outlet port.

Embodiments of units according to the invention will now be described with reference to the accompanying diagrammatic drawings in which:

DESCRIPTION OF THE PREFERRED EMBODIMENTS

Figure 1:
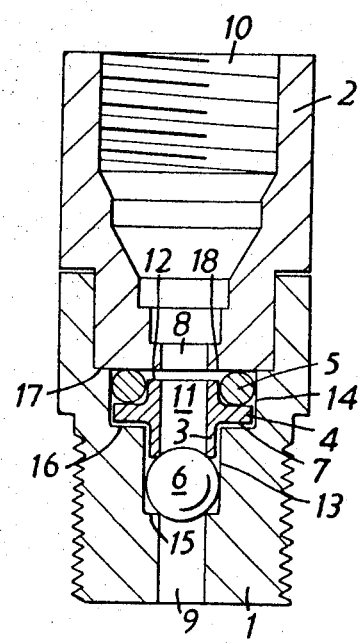
FIG. 1 is a longitudinal section of one embodiment and
FIG. 2 is a longitudinal section of another embodiment.

Referring to FIG. 1, the generally cylindrical body part 1 has an axial central inlet duct 9 extending from one end of the part to the other and widening by stepped increments towards the other end to form a housing chamber in which the moving parts of the unit are positioned. This chamber is not specifically indicated in the drawing, for the sake of clarity, and it is delimited by one end wall 18 of a second body part 2 which makes a fit with the other end of the body part 1. The body part 2 has an outlet duct 8 opening through wall 18 and connecting with a chamber 10, into which a unit delivery connection can be attached. The wall 18 abuts a step 17 in the wall of the body part 1. The parts 1 and 2 have a push fit but alternatively they may also be connected by cooperating thread sections.

As stated previously the duct 9 widens to form a housing chamber and within this chamber is positioned the first piston member 3, which has a cylindrical body part coaxially positioned relative to the part 1. This member 3 has a central passage 11 passing through it, which is in fluid connection with the outlet duct 8 in the part 2. A flange 4 extends outwardly from the cylindrical part of the member 3 intermediate the ends thereof. One end 12 of the member 3 is normally spaced from the wall 18 and the member 3 is biased from the wall 18 by a resilient annulus 5 positioned between the end wall 18 and the flange 4. The periphery of the flange 4 is spaced from the sidewall of the pump chamber so that the member 3 may move in a reciprocal path to and from the wall 18. A space 7 is formed in the said chamber between the side of the flange 4 not contacted by the annulus 5 and a step face 16 of the body part 1, and this space extends from the seal provided by the annulus 5 and constricted passage between a ball 6 and wall 13.

This ball 6, which is adapted to form a fluid seal with one end of the passage 11 in member 3, forms the second piston member. The ball 6 also seats on a step seat 15 of the body part 1 and its diameter is such that it is spaced from the sidewall 13 of the housing chamber by a small amount to form a constricted fluid passage between the space 7 and the inlet duct 9.

This unit displaces fluid from the inlet duct 9 to the outlet duct 8 and the operation of the unit will now be described, commencing with the components thereof in the positions shown in the drawing. As the fluid pressure in the inlet 9 increases the ball 6 and piston member 3 will be moved against the resilient force of the annulus 5 and will displace the fluid through the outlet 8 until the end 12 of the member 3 contacts the wall 18. The annulus 5 and the seat between the ball 6 and member 3 are both substantially fluidtight so that a piston action is obtained. Any further increase in the fluid pressure in the inlet 9 will not lead to any further displacement of the components and, therefore, the unit is not responsive to an excessive pressure signal.

As the fluid pressure at the inlet 9 begins to fall while the piston members 3 and 6 are still in their upper, displaced positions and there will be a higher fluid pressure in the space 7, due to the resilience of the annulus 5 and because the space between the ball 6 and the sidewall 13 is restricted.

This pressure in the space 7, acting downwardly on the outer diametrical part of the ball 6, will move it away from the member 3 and towards its seat end of the inlet 9, which it will close, thus preventing backflow of the fluid back to the inlet 9 through the constricted passage between the ball 6 and wall 13. Instead, fluid from the space 7 will be discharged into the passage 11, thus allowing the piston 3 to return to its lower position (as shown) ready for the next pump stroke.

Any back pressure in the outlet 8 will assist in separating the ball 6 from the piston member 3 but it will not otherwise affect operation of the device.

Figure 2:
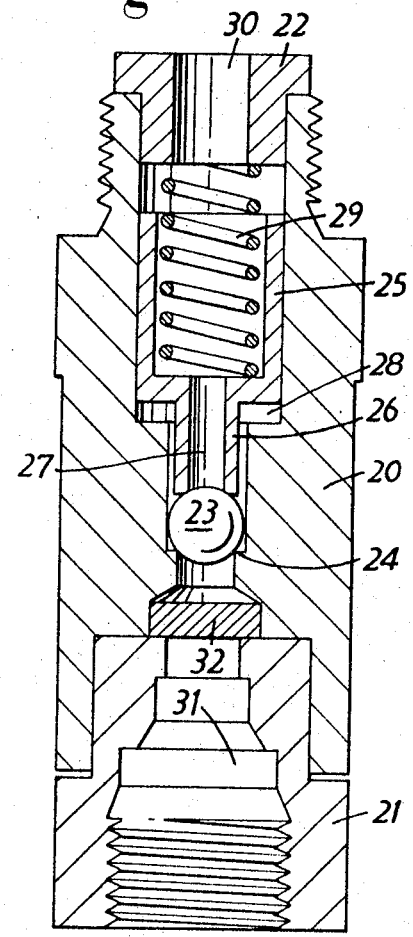

The other embodiment of the invention is shown in FIG. 2 and includes first, second and third body parts 20, 21, 22 which are push-fitted into each other. Alternately these body parts can be in screw threaded engagement. The first part 20 contains a housing chamber in which are positioned the moving elements of the unit. This chamber increases in diameter in stepped increments from the inlet port 3.

A ball 23, which forms the second piston member, seats in fluid-sealing contact on a step 24 in the housing chamber. A first piston member 25 is of generally cylindrical form, with an extension 26 of cylindrical form but of smaller diameter. Within this extension is a passage 27 which is closed at its inlet end by the ball 23, which contacts and seals with the end of the extension 26. A space 28 is formed between the piston member 25 and the constricted passage which is present between the ball 23 and the wall of the housing chamber within which the ball moves.

The first piston member 25 is in sliding contact with the housing chamber so as to seal the space 28 from the outlet 30. When the end of the passage 27 is closed by the ball 23. The first piston member 25 is biased from the third body part 22 by a helical spring 29. This helical spring extends within the cylindrical part of the first piston member 25. Fluid under pressure enters its unit through the inlet port 31.

This embodiment operates in the same manner as described for the first embodiment, and it being noted that the resilient annulus 5 has been replaced by the spring 29 in so far as its biasing functions are concerned. The sealing functions of the annulus 5 have been replaced by the fluid seal between the sealing surfaces of the first piston member 25 and the housing chamber. It will be noted that the movement of the first piston member 25 towards the outlet port is limited by the abutment of the piston 25 with the body part 22.

The modification by which the functions of the annulus 5 are achieved by other means to allow a longer stroke to be obtained by the piston member 25. Thus, while the first embodiment has its stroke limited by the dimensions of the annulus 5, a comparatively larger stroke is possible for the second embodiment, due to the use of a helical spring. The second embodiment is shown as including a filter element 32, this element removes contaminants which, for example, could interfere with the flow of fluid through the constricted passage.

The embodiment of FIG. 1 may also have a filter element in the inlet flow.

It will be noted that each embodiment has internally or externally threaded sections at its extreme ends. Suitably adapted fluid-supply pressure duration and frequency of the signals represented by interruptions in the supply pressure provided the signals reach a certain level of maximum pressure.

Although the present invention has been described by reference to only two embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A fluid displacement unit for delivering predetermined quantities of a fluid supplied to it under pressure in response to periodic increases and decreases in the said pressure, said unit comprising:
   a housing chamber having an inlet and an outlet for said fluid,
   a first piston which is reciprocable in said chamber and has a fluid passage extending through it,
   a second piston which is movable in said chamber between said inlet and said first piston which it engages to close said passage, said pistons together dividing a reserve space in part of said chamber from said inlet and said outlet except for a constricted passage for allowing fluid under pressure to flow from said inlet and said space past said second piston, and
   resilient means biasing said first piston against said second piston to close said passage whereby a supply of fluid to said inlet under pressure acts on and moves both said pistons together away from said inlet and against the force of said resilient means to discharge fluid from said chamber to said outlet while fluid from said inlet enters said reserve space through said constricted passage, whereas a drop in pressure in said inlet allows said resilient means to return said first piston to its original position, the pressure of the fluid in said reserve space first moving said second piston away from said first piston to allow this fluid from said space to be discharged through said passage.

2. A fluid displacement unit according to claim 1, wherein said second piston after being moved away from said first piston closes said inlet to prevent return flow of fluid through said constricted passage.

3. A fluid displacement unit according to claim 1, wherein said second piston is a ball.

4. A fluid displacement unit according to claim 1, wherein said constricted passage is formed between said second piston and a wall of said chamber.

5. A fluid displacement unit according to claim 1, wherein the said biasing means comprises an annulus made of a resilient material which is compressed as said first piston is moved towards said outlet.

6. A fluid displacement unit according to claim 5, wherein said chamber has a part of large diameter at its outlet end and a part of smaller diameter at its inlet end and wherein said first piston has a radially projecting flange intermediate its ends, said flange and said annulus being in engagement with each other and operating in said larger diameter part of said chamber, and wherein the end of said first piston away from said annulus extends into said smaller diameter part of said chamber, in which it is adapted to form a seal with said second piston.

7. A fluid displacement unit according to claim 1, wherein said annulus while it is compressed forms a fluid seal between said outlet and said space.

8. A fluid displacement unit according to claim 1, wherein the said biasing means is a helical spring.

9. A fluid displacement unit according to claim 8, wherein said first piston is slideable in and forms a fluid seal with the wall of said chamber.

10. A fluid displacement unit according to claim 1, which comprises a first body part in which said chamber and inlet are formed, and a second body part in which said outlet is formed, said inlet and outlet being coaxial with each other and said resilient means being compressed in an axial direction between said first piston and said second body part.

11. A fluid displacement unit for delivering predetermined quantities of a lubricant supplied to it under pressure in response to periodic increases and decreases in the said pressure, comprising:
   a housing chamber having an inlet and an outlet for said lubricant;
   first and second pistons movable in said chamber, said first piston having a passage through it which communicates with said outlet and which is adapted to be closed by said second piston while the latter is held against said first piston by the pressure of lubricant supplied to said inlet; and
   biasing means acting on said first piston to force it towards the inlet;
   the said housing chamber and pistons being so formed than together they provide a reserve space behind said first piston and a restricted passage connecting this reserve space with the inlet side of said second piston whereby a supply of lubricant under pressure to said inlet acts on both said pistons and while holding said second piston against said first piston to close said passage forces said pistons together towards said outlet to discharge a measured quantity of lubricant without substantial back leakage past said pistons and at the same time allows lubricant to enter said reserve space, and whereby a reduction in the inlet pressure causes the pressure of lubricant in said reserve space to move said second piston away from said first piston to open the said passage through said first piston before said first piston completes its return stroke.

12. A fluid displacement unit according to claim 11, wherein said second piston is in the form of a ball which closes the said passage in said first piston during the delivery stroke of said pistons and closes said inlet during the return stroke of said first piston, said restricted passage being provided by a clearance between said ball and the wall of the said chamber.

13. A fluid displacement unit according to claim 11, wherein said biasing means is provided by a ring of a resilient material which is compressed and forms a seal between said first piston and the outlet end of said chamber.